United States Patent
Tanaka et al.

(10) Patent No.: US 10,658,653 B2
(45) Date of Patent: May 19, 2020

(54) ELECTRODE MIXTURE PASTE FOR SODIUM SECONDARY CELL, POSITIVE ELECTRODE FOR SODIUM SECONDARY CELL, AND SODIUM SECONDARY CELL

(71) Applicant: SUMITOMO CHEMICAL COMPANY, LIMITED, Chuo-ku, Tokyo (JP)

(72) Inventors: Hidenaka Tanaka, Tsukuba (JP); Takitaro Yamaguchi, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/202,268

(22) Filed: Nov. 28, 2018

(65) Prior Publication Data

US 2019/0097209 A1    Mar. 28, 2019

Related U.S. Application Data

(63) Continuation of application No. 15/128,143, filed as application No. PCT/JP2015/059825 on Mar. 24, 2015, now abandoned.

(30) Foreign Application Priority Data

Mar. 31, 2014 (JP) ................................ 2014-071723

(51) Int. Cl.
| | |
|---|---|
| *H01M 4/13* | (2010.01) |
| *H01M 4/62* | (2006.01) |
| *H01M 10/054* | (2010.01) |
| *H01M 4/04* | (2006.01) |
| *H01M 4/139* | (2010.01) |
| *H01M 4/36* | (2006.01) |
| H01M 4/02 | (2006.01) |

(52) U.S. Cl.
CPC ........... *H01M 4/13* (2013.01); *H01M 4/0404* (2013.01); *H01M 4/139* (2013.01); *H01M 4/364* (2013.01); *H01M 4/62* (2013.01); *H01M 10/054* (2013.01); *H01M 2004/028* (2013.01)

(58) Field of Classification Search
CPC ...... H01M 4/13; H01M 4/0404; H01M 4/139; H01M 4/364; H01M 4/62; H01M 10/054; H01M 2004/028
See application file for complete search history.

(56) References Cited

U.S. PATENT DOCUMENTS

| | | |
|---|---|---|
| 6,124,057 A | 9/2000 | Ito et al. |
| 6,200,703 B1 | 3/2001 | Kashio et al. |
| 2001/0036579 A1 | 11/2001 | Hosoya |
| 2009/0194747 A1 | 8/2009 | Zou et al. |
| 2012/0015245 A1 | 1/2012 | Kishino et al. |
| 2012/0021273 A1 | 1/2012 | Ohmori et al. |
| 2012/0021282 A1 | 1/2012 | Katou et al. |
| 2012/0264019 A1 | 10/2012 | Saka |
| 2013/0224588 A1 | 8/2013 | Kageura |
| 2014/0079996 A1 | 3/2014 | Zou et al. |
| 2016/0197339 A1 | 7/2016 | Tanjo et al. |

FOREIGN PATENT DOCUMENTS

| | | |
|---|---|---|
| CN | 103262304 A | 8/2013 |
| JP | 10-79244 A | 3/1998 |
| JP | 10-233208 A | 9/1998 |
| JP | 11-45702 A | 2/1999 |
| JP | 2001-185221 A | 7/2001 |
| JP | 2011-511402 A | 4/2011 |
| JP | 2012-28086 A | 2/2012 |
| JP | 2012-38725 A | 2/2012 |
| JP | 2013-84522 A | 5/2013 |
| JP | 2013-229319 A | 11/2013 |
| WO | 2014/098037 A1 | 6/2014 |

OTHER PUBLICATIONS

Takeshi Kobayashi et al., "Performance of sodium cathode in sodium-ion battery and attempted development of all solid-state sodium battery", CRIEPI, May 2013, total 19 pages.

International Search Report dated Jun. 9, 2015, issued by the International Searching Authority in application No. PCT/JP2015/059825. [PCT/ISA/210].

Communication dated Nov. 6, 2018 from the Japanese Patent Office in counterpart Application No. 2016-511856.

English translation of WO 2013/146219, which corresponds to JP 2013-229319 A, which was previously dated Nov. 28, 2018.

*Primary Examiner* — Jane J Rhee
(74) *Attorney, Agent, or Firm* — Sughrue Mion, PLLC

(57) ABSTRACT

An electrode mixture paste for a sodium secondary battery contains a positive electrode active material capable of being doped and dedoped with a sodium ion, an electroconductive material, a binder, an organic solvent, and an acid having a valence number of 2 or more. The electrode mixture paste for a sodium secondary battery gives little change in viscosity with lapse of time even when there are no special facilities.

3 Claims, No Drawings

ELECTRODE MIXTURE PASTE FOR SODIUM SECONDARY CELL, POSITIVE ELECTRODE FOR SODIUM SECONDARY CELL, AND SODIUM SECONDARY CELL

CROSS REFERENCE TO RELATED APPLICATIONS

This application is a Continuation of pending U.S. application Ser. No. 15/128,143, filed Sep. 22, 2016, which is a National Stage of International Application No. PCT/JP2015/059825 filed Mar. 24, 2015, claiming priority based on Japanese Patent Application No. 2014-071723 filed Mar. 31, 2014, the contents of all of which are incorporated herein by reference in their entirety.

TECHNICAL FIELD

The present invention relates to an electrode mixture paste for a sodium secondary battery, a positive electrode for a sodium secondary battery, and a sodium secondary battery.

BACKGROUND ART

An electrode mixture is used for an electrode in a non-aqueous electrolyte secondary battery or the like, and a sodium secondary battery is studied as the nonaqueous electrolyte secondary battery. A sodium-containing compound constituting the sodium secondary battery is abundant in the amount of resources and also is an inexpensive material, and therefore, by putting this into practical use, it is expected that large-scale power sources can be supplied in a large amount.

The sodium secondary battery usually has at least one pair of electrodes including a positive electrode composed of a positive electrode containing sodium-containing compound that is doped and undoped with a sodium ion as a positive electrode active material and a negative electrode containing a negative electrode active material that is doped and undoped with a sodium ion, and has an electrolyte.

The electrode contains a current collector and an electrode mixture carried on the current collector. In order to carry the electrode mixture on the current collector, an electrode mixture paste containing the electrode mixture and an organic solvent is applied onto the current collector and dried. As the electrode mixture paste, there has been studied, for example, a material obtained by mixing and kneading an electrode active material such as a positive electrode active material or a negative electrode active material, an electroconductive material, a binder and an organic solvent (Non-Patent Document 1).

PRIOR ART DOCUMENTS

Non-Patent Document

Non-Patent Document 1: Takeshi KOBAYASHI and others, "Performance of electrodes in sodium-ion battery and attempted development of all solid-state battery", Report by Central Research Institute of Electric Power Industry, Central Research Institute of Electric Power Industry, May 2013, Research Report Q12011

A conventional electrode mixture paste has had a problem that the paste easily turns into gel prior to applying it onto a current collector after the electrode mixture paste is produced. The gelation means to generate a wet solid by chemical reaction of a substance or an impurity thereof in the electrode mixture paste. When gelation occurs, the fluidity of the electrode mixture paste becomes of a state in which the fluidity is considerably decreased because of changing the viscosity, resulting in making it difficult to apply the paste onto the current collector. According to non-Patent Document 1, it is discloses that an electrode mixture paste is produced and applied onto a current collector in facilities with controlling moisture (dew point of −65° C.).

SUMMARY OF THE INVENTION

Problems to be Solved by the Invention

However, the facilities with controlling moisture are expensive, and a large energy is needed for maintenance. Therefore, an object of the present invention is to provide an electrode mixture paste for a sodium secondary battery of which viscosity changes little with lapse of time even when there are no special facilities, a positive electrode for a sodium secondary battery that is obtained by using the electrode mixture paste for a sodium secondary battery, and a sodium secondary battery having the positive electrode for a sodium secondary battery.

Means for Solving the Problems

In order to achieve the object, there is provided an electrode mixture paste for a sodium secondary battery, containing a positive electrode active material that is doped and undoped with a sodium ion, an electroconductive material, a binder, an organic solvent, and an acid having a valence number of 2 or more.

Also, the present invention provides a positive electrode for a sodium secondary battery which is formed by applying the electrode mixture paste for a sodium secondary battery onto a current collector and drying the resultant.

Further, the present invention provides a sodium secondary battery having the positive electrode for a sodium secondary battery, a negative electrode containing a negative electrode active material that is doped and undoped with a sodium ion, and an electrolyte.

Effect of the Invention

The electrode mixture paste for a sodium secondary battery of the present invention is industrially extremely useful because its viscosity is little decreased with lapse of time and a stable application can be performed. Also, since the electrode obtained by using the electrode mixture paste for a sodium secondary battery provides a good adhesive force between the current collector and the electrode mixture and the separation of the electrode mixture from the current collector is suppressed in the battery fabrication step, the electrode is industrially extremely useful.

MODE FOR CARRYING OUT THE INVENTION

<Electrode Mixture Paste for Sodium Secondary Battery>

An electrode mixture paste for a sodium secondary battery of the present invention contains a positive electrode active material that is doped and undoped with a sodium ion, an electroconductive material, a binder, an organic solvent, and an acid having a valence number of 2 or more.

Since a positive electrode active material that is doped and undoped with a sodium ion reacts with moisture in air, handling under moisture control is essential.

It is preferable that the quality of the electrode mixture paste for a sodium secondary battery of the present invention is controlled in view of viscosity. Here, the viscosity represents resistance to flow of the liquid (fluid). In order to let a substance having a high viscosity flow, a large force must be applied. A substance having a low viscosity can be let to flow with a small force.

The viscosity of the electrode mixture paste for a sodium secondary battery of the present invention is measured by a method of reading an equilibrium value (constant-flow measurement) when a shear speed of 10 sec$^{-1}$ is applied with a stress rheometer. As the paste viscosity become higher, the paste fluidity decreases, and therefore controlling the flatness or the thickness distribution on the electrode surface becomes difficult during the application step. On the other hand, as the paste viscosity becomes lower, the fluidity increases, and therefore obtaining an electrode with a high flatness on the surface and a uniform thickness distribution becomes easier. However, when the paste viscosity becomes too low, there decrease in the mingling degree of the constituent substances in the paste, and then the paste is liable to separate into a solid layer and a liquid layer. For this reason, the paste viscosity is preferably 1000 mPa·s or higher and 100000 mPa·s or lower, more preferably 3000 mPa·s or higher and 15000 mPa·s or lower. It is preferable that the viscosity of the electrode mixture paste for a sodium secondary battery before application is always within this range.

The ratio of the total weight of the acid having a valence number of 2 or more, the positive electrode active material, the electroconductive material and the binder in the electrode mixture paste for a sodium secondary battery of the present invention is preferably 30 wt % or more, more preferably 35 wt % or more, and still more preferably 45 wt % or more, in view of reducing the energy needed for drying after application. Also, the ratio of the total weight is preferably 75 wt % or less, more preferably 70 wt % or less, and still more preferably 65 wt % or less, in view of increasing the fluidity.

<Acid having a Valence Number of 2 or More>

The electrode mixture paste for a sodium secondary battery of the present invention contains an acid having a valence number of 2 or more. The acid having a valence number of 2 or more is an acid that can release two or more protons by reacting with a base, and is specifically an acid with which the following reaction occurs.

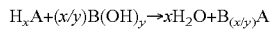

$$H_xA + (x/y)B(OH)_y \rightarrow xH_2O + B_{(x/y)}A$$

(In the formula, x is an integer of 2 or more, and y is an integer of 1 or more. $H_xA$ represents an acid, and $B(OH)y$ represents a base.) The above reaction preferably has an ionization equilibrium at two or more stages. The acid is preferably an acid having a valence number of 2 or 3. The acid may be either an organic acid or an inorganic acid. Two or more kinds of acids having a valence number of 2 or 3 may be mixed for use. The reason why the effect of the present application is exhibited by addition of a divalent acid is not clear; however, the present inventors infer that the acid neutralizes a basic compound that is produced by reaction of the positive active material with water present in air.

Examples of the organic acid include carboxylic acid, phosphonic acid, and sulfonic acid. Among these, a carboxylic acid such as oxalic acid, malic acid, succinic acid, or maleic acid is preferable. Two or more kinds of these may be mixed for use. Preferably, an anhydride is used.

Examples of the inorganic acid include phosphoric acid, sodium dihydrogenphosphate, sodium monohydrogenphosphate, trisodium phosphate, boric acid, sodium monohydrogenborate, sodium dihydrogenborate, sodium trihydrogenborate, and sulfuric acid. Two or more kinds of these may be mixed for use.

While the amount of addition of the acid having a valence number of 2 or more in the aforementioned electrode mixture paste for a sodium secondary battery differs depending on the kind of the active material or the acid, in order to increase the effect of the present invention, the amount of addition is preferably 0.01 wt % or more, more preferably 0.5 wt % or more, relative to the weight of the positive electrode active material. In order to increase the discharging capacity of the obtained sodium secondary battery, the amount of addition is preferably 5 wt % or less, more preferably 2 wt % or less.

<Organic Solvent>

In the present invention, examples of the organic solvent are amides such as N-methyl-2-pyrrolidone, N,N-dimethylacetamide, and dimethylformamide; alcohols such as isopropyl alcohol, ethyl alcohol, and methyl alcohol; ethers such as propylene glycol dimethyl ether; and ketones such as acetone, methyl ethyl ketone, and methyl isobutyl ketone, as polar solvents. Examples of non-polar solvents are hexane and toluene. Two or more kinds of these may be mixed for use.

<Positive Electrode Active Material that Doped and Undoped with a Sodium Ion>

In the present invention, the positive electrode active material is doped and undoped with a sodium ion, and is preferably made of a sodium-containing transition metal compound.

The following compounds are mentioned as examples of the aforementioned sodium-containing transition metal compound.

That is, oxides represented by $NaM^3_{a1}O_2$ such as $NaFeO_2$, $NaMnO_2$, $NaNiO_2$, $NaCoO_2$, $NaMn_{0.5}Ni_{0.5}O_2$, $NaFe_{0.5}Ni_{0.5}O_2$, $NaFe_{1/3}Mn_{1/3}Ni_{1/3}O_2$, and $NaFe_{0.4}Mn_{0.3}Ni_{0.3}O_2$, oxides represented by $Na_{0.44}Mn_{1-a2}M^3_{a2}O_2$, oxides represented by $Na_{0.7}Mn_{1-a2}M^3_{a2}O_{2.05}$ such as $Na_{0.7}Mn_{0.5}Ni_{0.5}O_2$ and $Na_{0.7}Mn_{2/3}Ni_{1/3}O_2$ ($M^3$ represents one or more kinds of transition metal elements. $0<a1<1$, $0 \le a2<1$);

oxides represented by $Na_{b1}M^4_cSi_{12}O_{30}$ such as $Na_6Fe_2Si_{12}O_{30}$ and $Na_2Fe_5Si_{12}O_{30}$ ($M^4$ represents one or more kinds of transition metal elements. $2 \le b1 \le 6$, $2 \le c \le 5$);

oxides represented by $Na_dM^5_eSi_6O_{18}$ such as $Na_2Fe_2Si_6O_{18}$ and $Na_2MnFeSi_6O_{18}$ ($M^5$ represents one or more kinds of transition metal elements. $2 \le d \le 6$, $1 \le e \le 2$);

oxides represented by $Na_fM^6_gSi_2O_6$ such as $Na_2FeSiO_6$ ($M^6$ represents a transition metal element or one or more kinds of elements selected from the group consisting of Mg and Al. $1 \le f \le 2$, $1 \le g \le 2$);

phosphates such as $NaFePO_4$, $NaMnPO_4$, $Na_3Fe_2(PO_4)_3$, $Na_3V_2(PO_4)_2F_3$, $Na_{1.5}VOPC_4F_{0.5}$, $Na_4Fe_3(PO_4)_2P_2O_7$, $Na_4Mn_3(PO_4)_2P_2O_7$, $Na_4Ni_3(PO_4)_2P_2O_7$, and $Na_4Co_3(PO_4)_2P_2O_7$;

fluorophosphates such as $Na_2FePO_4F$, $Na_2VPO_4F$, $Na_2MnPO_4F$, $Na_2CoPO_4F$, and $Na_2NiPO_4F$;

fluorosulfates such as $NaMnSO_4F$, $NaCoSO_4F$, and $NaFeSO_4F$;

borates such as $NaFeBO_4$ and $Na_3Fe_2(BO_4)_3$;

fluorides represented by $Na_hM^7F_6$ such as $Na_3FeF_6$ and $Na_2MnF_6$ ($M^7$ represents one or more kinds of transition metal elements. $2 \le h \le 3$); and others can be mentioned as examples.

As the aforementioned $M^3$ to $M^6$, at least one kind of Fe, Co, Cr, V, Ti, and Ni is preferable.

In the present invention, it is preferable to use a composite metal oxide represented by the following formula (A) as the aforementioned positive electrode active material. By using the composite metal oxide represented by the following formula (A) as the positive electrode active material, the charging and discharging capacity of the battery can be improved.

(Here, $M^1$ represents one or more kinds of elements selected from the group consisting of Mg, Ca, Sr, and Ba; $M^2$ represents one or more kinds of elements selected from the group consisting of Mn, Fe, Co, Cr, V, Ti, and Ni; a is a value within a range of 0.5 or more and 1.05 or less; b is a value within a range of 0 or more and 0.5 or less; and a+b is a value within a range of 0.5 or more and 1.10 or less.)

<Electroconductive Material>

In the present invention, a carbon material may be mentioned as an example of the electroconductive material. More specifically, graphite powder, carbon black (for example, acetylene black or the like), fibrous carbon material (carbon nanotube, carbon nanofiber, vapor-grown carbon fiber, or the like) and the like can be mentioned as examples. Carbon black (for example, acetylene black or the like) is provided in fine particles and has a large surface area and, by being added in a small amount in the electrode mixture, carbon black can increase the electric conductivity in the inside of the obtained electrode and can also improve the charging and discharging efficiency and large-current discharging characteristics. Typically, the ratio of the electroconductive material in the electrode mixture is 4 to 20 parts by weight relative to 100 parts by weight of the positive electrode active material, and two or more kinds may be contained as well.

<Binder>

Examples of the binder used in the aforementioned electrode mixture include a polymer of a fluorine compound and an addition polymer of a monomer having an ethylenic double bond that does not contain a fluorine atom.

The glass transition temperature of the aforementioned binder is preferably −50 to 25° C. By setting the glass transition temperature to be within the above range, the flexibility of the obtained electrode can be improved, and also a sodium secondary battery sufficiently usable even in a low-temperature environment can be obtained.

In the present invention, preferable examples of the binder include fluororesins such as polytetrafluoroethylene, polychlorotrifluoroethylene, tetrafluoroethylene-perfluoroalkylvinylether copolymer, ethylene-tetrafluoroethylene copolymer, ethylene-chlorotrifluoroethylene copolymer, and tetrafluoroethylene-hexafluoropropylene copolymer;

fluororubbers such as polyvinylidene fluoride, vinylidene fluoride-hexafluoropropylene copolymer, vinylidene fluoride-tetrafluoroethylene copolymer, vinylidene fluoride-hexafluoropropylene-tetrafluoroethylene copolymer, vinylidene fluoride-pentafluoropropylene copolymer, vinylidene fluoride-pentafluoropropylene-tetrafluoroethylene copolymer, vinylidene fluoride-perfluoromethylvinylether-tetrafluoroethylene copolymer, and vinylidene fluoride-chlorotrifluoroethylene copolymer;

acrylic polymers such as polyacrylic acid, alkali salts of polyacrylic acid (sodium polyacrylate, potassium polyacrylate, lithium polyacrylate, and the like), polyalkyl acrylate (carbon number of alkyl moiety being 1 to 20), acrylic acid-alkyl acrylate (carbon number of alkyl moiety being 1 to 20) copolymer, polyacrylonitrile, acrylic acid-alkyl acrylate-acrylonitrile copolymer, polyacrylamide, acrylonitrile-butadiene copolymer, and acrylonitrile-butadiene copolymer hydride;

methacrylic polymers such as polymethacrylic acid, polyalkyl methacrylate (carbon number of alkyl moiety in the alkyl group being 1 to 20), and methacrylic acid-alkyl methacrylate copolymer;

olefinic polymers such as polyvinyl alcohol (partially saponified or completely saponified), ethylene-vinyl alcohol copolymer, polyvinylpyrrolidone, ethylene-vinyl acetate copolymer, ethylene-vinyl acetate-alkyl acrylate (carbon number of alkyl moiety in the alkyl group being 1 to 20) copolymer, ethylene-methacrylic acid copolymer, ethylene-acrylic acid copolymer, ethylene-alkyl methacrylate copolymer, ethylene-alkyl acrylate copolymer, and ethylene-acrylonitrile copolymer; and styrene-containing polymers such as acrylonitrile-styrene-butadiene copolymer, styrene-acrylonitrile copolymer, styrene-butadiene copolymer, and styrene-butadiene copolymer hydride.

It is known that an electrode mixture has an intrinsic electrode mixture density depending on the binder. When a copolymer having a structural unit deriving from vinylidene halide is used as the binder, it is easy to obtain an electrode having a high electrode mixture density, thereby advantageously improving the volume energy density of the battery.

<Method of Producing Positive Electrode Active Material>

A sodium-containing transition metal oxide as one example of the positive electrode active materials can be produced by firing a mixture of metal-containing compounds having a composition capable of being a sodium-containing transition metal oxide used in the present invention by firing. Specifically, the sodium-containing transition metal oxide can be produced by weighing and mixing metal-containing compounds containing corresponding metal elements so as to be a predetermined composition and thereafter firing the obtained mixture. For example, a sodium-containing transition metal oxide having a metal element ratio represented by Na:Mn:Fe:Ni=1:0.3:0.4:0.3 which is one of the preferable metal element ratios can be produced by weighing respective source materials of $Na_2CO_3$, $MnO_2$, $Fe_3O_4$, and $Ni_2O_3$ so that a molar ratio of Na:Mn:Fe:Ni will be 1:0.3:0.4:0.3, mixing these source materials, and firing the obtained mixture. When the sodium-containing transition metal oxide contains $M^1$ ($M^1$ represents one or more kinds of elements selected from the group consisting of Mg, Ca, Sr, and Ba), a source material containing $M^1$ may be added at the time of mixing.

As the metal-containing compounds that can be used in producing the sodium-containing transition metal compound used in the present invention, there is used oxides and compounds capable of becoming oxides when decomposed and/or oxidized at a high temperature, for example, hydroxide, carbonate, nitrate, halide, or oxalate. The sodium compound may be, for example, one or more kinds of compounds selected from the group consisting of sodium hydroxide, sodium chloride, sodium nitrate, sodium peroxide, sodium sulfate, sodium hydrogencarbonate, sodium oxalate, and sodium carbonate. Hydrates of these can also be mentioned as examples. From a viewpoint of the handling property, the sodium compound is more preferably sodium carbonate. As a manganese compound, $MnO_2$ is preferable; as an iron compound, $Fe_3O_4$ is preferable; and as a nickel compound, $Ni_2O_3$ is preferable. Also, these metal-containing compounds may be hydrates.

A mixture of the metal-containing compounds can be obtained, for example, by obtaining a precursor of the metal-containing compounds by the following precipitation method and mixing the obtained precursor of the metal-containing compounds with the aforementioned sodium compound.

Specifically, by using a compound such as chloride, nitrate, acetate, formate, or oxalate as a source material of $M^2$ (here, $M^2$ has the same meaning as described above), these may be dissolved into water and brought into contact with a precipitation reagent to obtain a precipitate containing the precursor of the metal-containing compounds. Among these source materials, chloride is preferable. Also, when a source material hardly soluble into water is used, for example, when oxide, hydroxide, or a metal material is used as the source material, these source materials may be dissolved into acid such as hydrochloric acid, sulfuric acid, or nitric acid, or an aqueous solution of these to obtain an aqueous solution containing $M^2$.

Further, as the precipitation reagent, it is possible to use one or more compounds selected from the group consisting of LiOH (lithium hydroxide), NaOH (sodium hydroxide), KOH (potassium hydroxide), $Li_2CO_3$ (lithium carbonate), $Na_2CO_3$ (sodium carbonate), $K_2CO_3$ (potassium carbonate), $(NH_4)_2CO_3$ (ammonium carbonate), and $(NH_2)_2CO$ (urea), $Na_2CO_3$, $NaHCO_3$, $B_2O_3$, and $H_3BO_3$. One or more kinds of hydrates of the compounds may be used, or compounds and hydrates may be used in combination. Also, these precipitation reagents are preferably dissolved into water and used as an aqueous solution. The concentration of the precipitation reagent of the aqueous solution is about 0.5 to 10 mol/L, preferably about 1 to 8 mol/L. Also, as the precipitation reagent, it is preferable to use KOH, more preferably an aqueous solution of KOH obtained by dissolving this into water. Also, as the precipitation reagent of the aqueous solution, ammonia water may be mentioned as an example, and this may be used in combination with the aqueous solution of the aforementioned compound.

As a method of bringing the aqueous solution containing $M^2$ into contact with the precipitation reagent, there can be mentioned a method of adding the precipitation reagent (including an aqueous solution of the precipitation reagent) into the aqueous solution containing $M^2$, a method of adding the aqueous solution containing $M^2$ into the aqueous solution of the precipitation reagent, and a method of adding the aqueous solution containing $M^2$ and the precipitation reagent (including an aqueous solution of the precipitation reagent) into water. At the time of addition of these, the addition is preferably accompanied by stirring. Also, among the above-described methods of bringing into contact, the method of adding the aqueous solution containing $M^2$ into the aqueous solution of the precipitation reagent is preferable in that pH can be easily maintained and the particle diameter can be easily controlled. In this case, according as the aqueous solution containing $M^2$ is added into the aqueous solution of the precipitation reagent, the pH thereof tends to decrease. It is better to add the aqueous solution containing $M^2$ while adjusting this pH to be 9 or more, preferably 10 or more. Further, this adjustment can also be carried out by adding the aqueous solution of the precipitation reagent.

By the aforementioned contact, the precipitate can be obtained. This precipitate contains a precursor of the metal-containing compound.

Also, after the contact of the aqueous solution containing $M^2$ with the precipitation reagent, a slurry is typically formed, and this may be subjected to solid-liquid separation to collect the precipitate. While the solid-liquid separation may be carried out by any method, from the viewpoint of operability, a method by solid-liquid separation such as filtration is preferably used, and also a method of volatilizing the liquid component by heating such as spray drying may be used. The collected precipitate may be subjected to washing, drying, and the like. A superfluous precipitation reagent component may adhere to the precipitate obtained after solid-liquid separation, and the component can be reduced by washing. As a washing liquid used in washing, water is preferably used, or a water-soluble organic solvent such as alcohol or acetone may be used. Also, the drying may be carried out by heating drying, and blowing drying, vacuum drying, or the like may be carried out. When the drying is carried out by heating drying, the drying is carried out typically at 50 to 300° C., preferably about 100 to 200° C. Also, the washing and drying may be carried out two or more times.

While the mixing method may be carried out either by dry mixing or wet mixing, from the viewpoint of convenience, dry mixing is preferable. Examples of the mixing apparatus include a stirring mixer, a V-type mixer, a W-type mixer, a ribbon mixer, a drum mixer, and a ball mill. Also, the firing may be carried out with holding typically at a temperature of about 400 to 1200° C., preferably about 500 to 1000° C., though this depends on the kind of the sodium compound to be used. Also, the period of time for holding at the aforementioned holding temperature is typically 0.1 to 20 hours, preferably 0.5 to 10 hours. The temperature-raising speed up to the aforementioned holding temperature is typically 50 to 400° C./hour, and the temperature-lowering speed from the aforementioned holding temperature down to room temperature is typically 10 to 400° C./hour. Also, as an atmosphere for firing, air, oxygen, nitrogen, argon, or a mixed gas of these can be used, and air is preferable.

By using a halide such as fluoride or chloride or the like in a suitable amount as the metal-containing compound, the crystallinity of the produced composite metal oxide and the average particle diameter of the particles constituting the composite metal oxide can be controlled. In this case, the halide may in some cases function as a reaction promoter (flux). Examples of the flux include NaF, $MnF_3$, $FeF_2$, $NiF_2$, $CoF_2$, NaCl, $MnCl_2$, $FeCl_2$, $FeCl_3$, $NiCl_2$, $CoCl_2$, $NH_4Cl$, and $NH_4I$, and these can be used as a source material of the mixture (metal-containing compound) or by being added in a suitable amount to the mixture. Also, these fluxes may be hydrates.

In the case in which the sodium-containing transition metal compound used in the present invention is used as a positive electrode active material for a sodium secondary battery, the sodium-containing transition metal compound obtained in the above-described manner is preferably subjected to crushing using an arbitrary apparatus that is typically used industrially, such as a ball mill, a jet mill, or a vibration mill, and washed and classified or the like so as to adjust the particle size. The firing may be carried out for two or more times. Also, the particle surface of the sodium-containing transition metal compound may be subjected to a surface treatment such as covering with an inorganic substance containing Si, Al, Ti, Y, or the like.

Here, in the case in which a heat treatment is carried out after the above surface treatment, there may be cases in which the BET specific surface area of the powder after the heat treatment becomes smaller than a range of the BET specific surface area before the above surface treatment, though this depends on the temperature of the heat treatment.

<Method of Producing Electrode Mixture Paste for Sodium Secondary Battery>

The electrode mixture paste for a sodium secondary battery of the present invention can be obtained by kneading a positive electrode active material that is doped and undoped with a sodium ion, an electroconductive material, a binder, an organic solvent, and an acid having a valence number of 2 or more. While a kneading method is not particularly limited, a mixer having a high shear force is preferable as a mixer used for kneading. Specifically, a planetary mixer, a kneader, an extrusion-type kneader, a thin-film rotation-type high-speed stirrer, and the like can be mentioned as examples.

In the mixing order, the acid having a valence number of 2 or more, the positive electrode active material that is doped and undoped with a sodium ion, the electroconductive agent, the binder, and the organic solvent may be collectively mixed, or alternatively, the acid having a valence number of 2 or more, the binder, the positive electrode active material that is doped and undoped with a sodium ion, and the electroconductive agent may be sequentially mixed into the organic solvent. This order is not particularly limited, and it is also possible to adopt a process of gradually adding a mixture of the positive electrode active material that is doped and undoped with a sodium ion and the electroconductive agent. Also, the acid having a valence number of 2 or more and the binder may be mixed and dissolved in advance in the organic solvent.

<Method of Producing Positive Electrode for Sodium Secondary Battery>

The positive electrode for a sodium secondary battery of the present invention is preferably obtained by applying the electrode mixture paste for a sodium secondary battery of the present invention onto a current collector and drying the resultant. By drying, the solvent in the electrode mixture paste is removed, and the electrode mixture is bound to the current collector, resulting in obtaining the positive electrode.

In the positive electrode of the present invention, an electrical conductor such as Al, Al alloy, Ni, or stainless steel can be mentioned as an example of the current collector, and Al is preferable because Al can be easily processed into a thin film and is inexpensive. The shape of the current collector may be, for example, a foil shape, a flat plate shape, a mesh shape, a net shape, a lath shape, a punching metal shape, an embossed shape, or a combination of these (for example, a mesh-shaped flat plate or the like). Undulation may be formed by an etching treatment on the current collector surface.

A method of applying the electrode mixture paste for a sodium secondary battery of the present invention onto the current collector is not particularly limited. For example, a method such as the slit die application method, the screen application method, the curtain application method, the knife application method, the gravure application method, or the electrostatic spraying method can be mentioned. Also, as the drying that is carried out after the application, the drying may be carried out by a heat treatment or by blowing drying or vacuum drying. When the drying is carried out by a heat treatment, the temperature thereof is typically about 50 to 150° C. Also, pressing may be carried out after the drying. As the pressing method, a method such as the mold pressing or the roll pressing can be mentioned as an example. By the method described above, the positive electrode of the present invention can be produced. Also, the thickness of the positive electrode is typically about 5 to 500 μm.

<Sodium Secondary Battery of the Present Invention>

The sodium secondary battery of the present invention has a positive electrode for a sodium secondary battery of the present invention, a negative electrode containing a negative electrode active material that is doped and undoped with a sodium ion, and an electrolyte. The sodium secondary battery of the present invention can be produced, for example, by stacking and winding a positive electrode of the present invention, a separator, and a negative electrode, which is formed in such a manner that a negative electrode mixture is carried on a negative electrode current collector, in this order to obtain an electrode group, storing this electrode group into a battery can, and impregnating the electrode group with an electrolytic solution made of an organic solvent containing the electrolyte.

Here, the shape of this electrode group may be, for example, a shape such that the cross section obtained by cutting this electrode group in a direction perpendicular to the axis of winding is a circle, an ellipse, a rectangle, a rectangle with rounded corners, or the like. Also, the shape of the battery may be, for example, a shape such as a paper type, a coin type, a cylindrical type, or a prismatic type.

<Non-Aqueous Electrolyte Secondary Battery of the Present Invention—Negative Electrode>

The negative electrode that can be used in the sodium secondary battery of the present invention may be an electrode in which a negative electrode mixture containing a negative electrode active material is carried on a negative electrode current collector, or a sodium metal or sodium alloy electrode that is doped and undoped with a sodium ion. In addition to the aforementioned sodium metal or sodium alloy, examples of the negative electrode active material include carbon materials such as cokes, carbon black, thermally decomposed carbon, carbon fiber, and a fired organic polymer compound material, and metals that is doped and undoped with a sodium ion. The shape of the carbon material may be, for example, any one of a thin chip shape such as natural graphite, a spherical shape such as mesocarbon microbeads, a fibrous shape such as graphitized carbon fiber, and an agglomerate of fine powders. Here, the carbon material may in some cases function as the electroconductive material.

The carbon material may be, for example, a non-graphitized carbon material (which may hereafter be referred to as hard carbon) such as carbon black, thermally decomposed carbon, carbon fiber, or a fired organic material. The hard carbon is preferably one in which the interlayer distance d(002) as determined by the X-ray diffraction method is 0.360 nm or more and 0.395 nm or less, and the size Lc of the crystallite in the c-axis direction is 1.30 nm or less. Also, the hard carbon is preferably one in which an R value (ID/IG) obtained by the Raman spectroscopy measurement is 1.07 or more and 3 or less. Here, R value (ID/IG) is obtained by dividing ID by IG, in a Raman spectrum obtained by conducting Raman spectrometry by irradiating with a laser beam having a wavelength of 532 nm (the vertical axis indicates scattered light intensity of an arbitrary unit and the horizontal axis indicates a Raman shift wave number ($cm^{-1}$)), wherein, in a fitting spectrum which has one peak in the range of 1300 to 1400 $cm^{-1}$ of the horizontal axis and in the range of 1570 to 1620 $cm^{-1}$ of the horizontal axis respectively and which is obtained by conducting a fitting using two Lorentz functions and one baseline function for a wave number range of 600 to 1740 $cm^{-1}$ of a spectrum and removing the baseline function from the fitting function, the maximum value of the vertical axis in the range of the 1300 to 1400 cm$^{-1}$ is defined as ID, and the maximum value of the vertical axis in the range of the 1570 to 1620 cm$^{-1}$ is defined as IG.

The hard carbon may be, for example, carbon microbeads made of a non-graphitized carbon material. Specifically, ICB manufactured by Nippon Carbon Co., Ltd. (trade name: NICABEADS) may be mentioned as an example. The shape of the particles constituting the carbon material may be, for example, a thin chip shape such as natural graphite, a spherical shape such as mesocarbon microbeads, a fibrous shape such as graphitized carbon fiber, or a shape of an agglomerate of fine particles. When the shape of the particles constituting the carbon material is spherical, the average particle diameter thereof is preferably 0.01 μm or more and 30 μm or less, more preferably 0.1 μm or more and 20 μm or less.

Specific examples of the metal used in the negative electrode active material include tin, lead, silicon, germanium, phosphorus, bismuth, and antimony. Examples of the alloy include an alloy made of two or more kinds of metals selected from the group consisting of the metals described above and an alloy made of two or more kinds of metals selected from the group consisting of the metals described above and the transition metals, and also include alloys such as Si—Zn, $Cu_2Sb$, and $La_3Ni_2Sn_2$. These metals and alloys are used in combination with the carbon materials and carried on the current collector for use as the negative electrode active material.

The oxide used in the negative electrode active material may be, for example, $Li_4Ti_5O_{12}$ or the like. The sulfide may be, for example, $TiS_2$, $NiS_2$, $FeS_2$, $Fe_3S_4$, or the like. The nitride may be, for example, $Na_{3-x}M_xN$ (here, M represents a transition metal element, and $0 \leq x \leq 3$) such as $Na_3N$ or $Na_{2.6}Co_{0.4}N$, or the like.

These carbon materials, metals, oxides, sulfides, and nitrides which are negative electrode active materials may be used in combination and may be either crystalline or noncrystalline. From the viewpoint of cycle characteristics, a carbon material is preferably used as the negative electrode active material, and hard carbon is more preferably used.

These carbon materials, metals, oxides, sulfides, and nitrides are mainly carried on the current collector and used as the electrode.

The negative electrode mixture may contain a binder and an electroconductive material, if necessary. As examples of the binder and the electroconductive material, those similar to the binders used in the aforementioned positive electrode mixture may be mentioned.

Preferable examples of the binder contained in the negative electrode mixture include polyacrylic acid, sodium polyacrylate, lithium polyacrylate, potassium polyacrylate, carboxymethyl cellulose, hydroxymethyl cellulose, hydroxyethyl cellulose, hydroxypropyl cellulose, ethylene-vinyl acetate copolymer, styrene-butadiene copolymer, polyvinylidene fluoride, polytetrafluoroethylene, vinylidene fluoride-tetrafluoroethylene copolymer, and vinylidene fluoride-hexafluoropropylene-tetrafluoroethylene copolymer. These may be used either alone or in combination of two or more kinds. From the viewpoint of improving the wettability of the electrolytic solution to the negative electrode mixture, it is preferable to use one or more kinds selected from the group consisting of polyvinylidene fluoride, vinylidene fluoride-tetrafluoroethylene copolymer, and vinylidene fluoride-hexafluoropropylene-tetrafluoroethylene copolymer as the binder contained in the negative electrode mixture.

The ratio of the binder in the negative electrode mixture is typically about 0.5 to 30 parts by weight, preferably about 2 to 20 parts by weight, relative to 100 parts by weight of the carbon material.

As an example of the negative electrode current collector, Al, Al alloy, Cu, Ni, or stainless steel can be mentioned, and Al is preferable because Al can be easily processed into a thin film and is inexpensive. The shape of the current collector may be, for example, a foil shape, a flat plate shape, a mesh shape, a net shape, a lath shape, a punching metal shape, an embossed shape, or a combination of these (for example, a mesh-shaped flat plate or the like). Undulation may be formed by an etching treatment on the current collector surface.

<Sodium Secondary Battery of the Present Invention-Separator>

As the separator that can be used in the sodium secondary battery of the present invention, it is possible to use a material having a form of a porous film, a non-woven cloth, a woven cloth, or the like which is made of a material such as a polyolefin resin such as polyethylene or polypropylene, a fluororesin, a nitrogen-containing aromatic polymer, or the like. Also, two or more kinds of these materials may be used to form a monolayer or multilayer separator. The separator may be, for example, a separator disclosed in JP-A-2000-30686, JP-A-10-324758, or the like. The thickness of the separator is preferably as thin as possible as long as the mechanical strength is maintained, in view of increasing the volume energy density of the battery and reducing the internal resistance. Typically, the thickness of the separator is preferably about 5 to 200 μm, more preferably about 5 to 40 μm.

The separator preferably has a porous film containing a thermoplastic resin. Usually, in the secondary battery, when an abnormal electric current flows within the battery due to short-circuiting or the like between the positive electrode and the negative electrode, it is important to shut off the electric current to prevent an excessive electric current from flowing (to shut down). Therefore, it is required in the separator that the shutdown is carried out (in the case in which the separator has a porous film containing a thermoplastic resin, the fine holes of the porous film are closed) at a temperature as low as possible, and that, even when the temperature within the battery rises to a high temperature of a certain degree after the shutdown, the separator membrane is not broken at that temperature, and the shut-down state is maintained, that is, it is required that the separator has a high heat resistance. The membrane breakage in the secondary battery of the present invention by heat can be prevented to a further extent by using a separator having a multilayer porous film, which is formed by stacking a heat-resistant porous layer containing a heat-resistant resin and a porous film containing a thermoplastic resin, as the separator. Here, the heat-resistant porous layer may be stacked on both surfaces of the porous film.

<Sodium Secondary Battery of the Present Invention-Elecrolytic Solution or Solid Electrolyte>

In the elecrolytic solution that can be used in the sodium secondary battery of the present invention, examples of the electrolyte include $NaClO_4$, $NaPF_6$, $NaAsF_6$, $NaSbF_6$, $NaBF_4$, $NaCF_3SO_3$, $NaN(SO_2CF_3)_2$, sodium salt of lower aliphatic carboxylic acid, and $NaAlCl_4$, and a mixture of two or more kinds of these may be used as well. Among these, it is preferable to use an electrolyte containing at least one kind selected from the group consisting of $NaPF_6$, $NaAsF_6$, $NaSbF_6$, $NaBF_4$, $NaCF_3SO_3$, and $NaN(SO_2CF_3)_2$ that contain fluorine.

In the elecrolytic solution that can be used in the sodium secondary battery of the present invention, examples of the organic solvents that can be used include carbonates such as propylene carbonate, ethylene carbonate, dimethyl carbonate, diethyl carbonate, ethyl methyl carbonate, isopropyl methyl carbonate, vinylene carbonate, 4-trifluoromethyl-1,3-dioxolane-2-one, and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyltetrahydrofuran; esters such as methyl formate, methyl acetate, and 7-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propanesultone; and solvents obtained by further introducing a fluorine substituent into the above organic solvents. Typically, two or more kinds of these are mixed for use as the organic solvent.

Also, instead of the above electrolytic solution, a solid electrolyte may be used. As the solid electrolyte, it is possible to use, for example, a polymer electrolyte such as a polyethylene oxide based polymer compound or a polymer compound containing at least one or more kinds of a polyorganosiloxane chain or a polyoxyalkylene chain. Also, it is possible to use a so-called gel type in which a non-aqueous electrolyte solution is held by a polymer. Also, the safety can be in some cases further more enhanced by using a sulfide electrolyte such as $Na_2S$—$SiS_2$, $Na_2S$—$GeS_2$, $Na_2S$—$P_2S_5$, or $Na_2S$—$B_2S_3$, an inorganic compound electrolyte containing a sulfide such as $Na_2S$—$SiS_2$—$Na_3PO_4$ or $Na_2S$—$SiS_2$—$Na_2SO_4$, or a NASICON type electrolyte such as $NaZr_2(PO_4)_3$. Also, in the case in which a solid electrolyte is used in the sodium secondary battery of the present invention, the solid electrolyte may have a function as a separator in some cases. In this case, the separator may not be needed.

EXAMPLES

Hereafter, the present invention will be described in further more detail by way of Examples. Here, various evaluations on composite metal oxide were carried out by the following measurements.
1. Powder X-Ray Diffraction Measurement of Composite Metal Oxide The powder X-ray diffraction measurement of the composite metal oxide was carried out by using RINT2500TTR type manufactured by Rigaku Corporation. An exclusive-use holder was filled with the composite metal oxide, and the measurement was carried out within a range of diffraction angle $2\theta=10$ to $90°$ by using a $CuK\alpha$-ray source, so as to obtain a powder X-ray diffraction diagram.
2. Compositional analysis of composite metal oxide After the powder was dissolved into hydrochloric acid, measurement was carried out by using inductively coupled plasma emission spectrometry (manufactured by SII, SPS3000, which may hereafter be referred to as ICP-AES).

<Production Example 1> (Production of Electrode Active Material $A^1$)

In a beaker made of polypropylene, 44.88 g of potassium hydroxide was added into 300 ml of distilled water and was dissolved by stirring, so as to dissolve the potassium hydroxide completely, thereby to prepare an aqueous solution of potassium hydroxide (precipitation reagent). Further, in another beaker made of polypropylene, 21.21 g of iron (II) chloride tetrahydrate, 19.02 g of nickel (II) chloride hexahydrate, and 15.83 g of manganese (II) chloride tetrahydrate were added into 300 ml of distilled water and were dissolved by stirring, thereby to obtain an aqueous solution containing iron, nickel, and manganese. While the above precipitation reagent was being stirred, the above aqueous solution containing iron, nickel, and manganese was dropwise added into this, thereby to obtain a slurry in which a precipitate had been formed. Subsequently, the slurry was subjected to filtration and washing with distilled water and was dried at 100° C. to obtain the precipitate. After the precipitate, sodium carbonate, and potassium hydroxide were weighed so as to attain a molar ratio of Fe:Na:Ca=0.4:0.99:0.01, these were subjected to dry mixing with use of an agate mortar so as to obtain a mixture. Subsequently, the mixture was put into a firing container made of alumina and was fired by holding at 850° C. for 6 hours in an ambient air atmosphere with use of an electric furnace. Thereafter, the resultant was cooled to room temperature to obtain a composite metal oxide $A^1$. When powder X-ray diffraction analysis was carried out on the composite metal oxide $A^1$, it was found out that the composite metal oxide $A^1$ was attributed to a crystal structure of $\alpha$-$NaFeO_2$ type. Also, when the composition of the composite metal oxide $A^1$ was analyzed by ICP-AES, the molar ratio of Na:Ca:Fe:Ni:Mn was found to be 0.99:0.01:0.4:0.3:0.3.

[Dissolution of Acid having a Valence Number of 2 or more into NMP]

As an organic acid among the acids having a valence number of 2 or more, oxalic acid was dissolved at 20 wt % into NMP (lithium battery grade, manufactured by Kishida Chemical Co., Ltd.) so as to prepare $K^1$.

As an inorganic acid among the acids having a valence number of 2 or more, phosphoric acid was dissolved at 10 wt % into NMP (lithium battery grade, manufactured by Kishida Chemical Co., Ltd.) so as to prepare $K^2$.

Example 1 (Production of Electrode Mixture Paste $P^1$)

For production of electrode mixture paste $P^1$, $A^1$ in Production Example 1 as an electrode active material, acetylene black (HS100, manufactured by Denki Kagaku Kogyo Kabushiki Kaisha) as an electroconductive material, a PVdF #7305 solution (PVdF:NMP=5:95, manufactured by Kureha Corporation) as a binder, and $K^1$ as an NMP solution of an acid having a valence number of 2 or more were used. These were weighed so as to attain a ratio of $A^1$:HS100:PVdF=90:5:5 (weight ratio). To this, $K^1$ was added so as to attain a ratio of $A^1$:oxalic acid=100:0.5 (weight ratio), and the resultant was stirred and mixed with use of a Dispermat (VMA Getzmann GMBH (manufactured by VMA-GETZMANN GMBH) to obtain an electrode mixture paste $P^1$. The rotation conditions were set to be 3,000 rpm and 10 minutes.

Example 2 (Production of Electrode Mixture Paste $P^2$)

An electrode mixture paste $P^2$ was obtained by an operation similar to that of Example 1 except that $K^1$ was added so as to attain a ratio of $A^1$:oxalic acid=100:1 (weight ratio).

Example 3 (Production of Electrode Mixture Paste P$^3$)

An electrode mixture paste P$^3$ was obtained by an operation similar to that of Example 1 except that K$^1$ was added so as to attain a ratio of A$^1$:oxalic acid=100:2 (weight ratio).

Example 4 (Production of Electrode Mixture Paste P$^4$)

An electrode mixture paste P$^4$ was obtained by an operation similar to that of Example 1 except that K$^2$ was added so as to attain a ratio of A$^1$:phosphoric acid=100:0.25 (weight ratio).

Example 5 (Production of Electrode Mixture Paste P$^5$)

An electrode mixture paste P$^5$ was obtained by an operation similar to that of Example 1 except that K$^2$ was added so as to attain a ratio of A$^1$:phosphoric acid=100:0.5 (weight ratio).

Example 6 (Production of Electrode Mixture Paste P$^6$)

An electrode mixture paste P$^6$ was obtained by an operation similar to that of Example 1 except that K$^2$ was added so as to attain a ratio of A$^1$:phosphoric acid=100:1 (weight ratio).

Comparative Example 1 (Production of Electrode Mixture Paste V$^1$)

An electrode mixture paste V$^1$ was obtained by an operation similar to that of Example 1 except that K$^1$ was not added.

For viscosity measurement of the electrode mixture paste, a stress rheometer (manufactured by TA Instruments Japan Inc., AR-550) was used. The data were obtained by reading an equilibrium value when a constant shear speed was applied while a temperature of 23° C. was maintained. With respect to the above electrode mixture pastes P$^1$ to P$^6$ and V$^1$, measurement was carried out 3 hours after and 24 hours after fabrication of the electrode mixture paste, and the fluidity stability of the electrode mixture paste was evaluated from change in the viscosity thereof. The results obtained with respect to the viscosity of 10 sec$^{-1}$ are shown in Table 1. Also, the case in which it is described that measurement was impossible in Table 1 refers to a case in which the electrode mixture paste had been gelified, making it impossible to carry out the viscosity measurement.

TABLE 1

| | Paste | Paste viscosity (3 hours after) (mPa·s) | Paste viscosity (24 hours after) (mPa·s) | Gelification |
|---|---|---|---|---|
| Example 1 | P$^1$ | 7014 | 8296 | — |
| Example 2 | P$^2$ | 5730 | 5662 | — |
| Example 3 | P$^3$ | 6642 | 9484 | — |
| Example 4 | P$^4$ | 5674 | 6062 | — |
| Example 5 | P$^5$ | 6299 | 6150 | — |
| Example 6 | P$^6$ | 5092 | 4346 | — |
| Comparative Example 1 | V$^1$ | 10330 | Measurement impossible | Gelation |

About 24 hours after the fabrication of the electrode mixture pastes P$^1$ to P$^6$ and V$^1$, the electrode mixture pastes were each applied onto an aluminum foil having a thickness of 20 μm with use of a doctor blade. After the electrode mixture paste was dried by blowing air at 60° C. for one hour, the electrode mixture paste was rolled under a pressure of 0.5 MPa with use of a roll press. Thereafter, the resultant was subjected to vacuum drying at 150° C. for 8 hours to obtain electrodes DP$^1$ to DP$^6$ and DV$^1$.

For measurement of the adhesion strength of the above electrode, an autograph (manufactured by Shimadzu Corporation, AGS-G) was used. That is, a tape having a width of 25 mm and a length of 50 mm (manufactured by Nichiban Co., Ltd., NW-K25) was stuck onto the electrode, and a strength (peeling strength) at the time when the tape was peeled off in a 180° direction at a speed of 100 mm/min was measured. Table 2 shows the results of the electrode peeling strength measurement. Also, the case in which it is described that measurement was impossible in Table 2 refers to a case in which the paste had been gelified and settled, making it impossible to apply the paste.

TABLE 2

| | Electrode | Electrode peeling strength (N/m) |
|---|---|---|
| Example 1 | DP$^1$ | 279 |
| Example 2 | DP$^2$ | 236 |
| Example 3 | DP$^3$ | 185 |
| Example 4 | DP$^4$ | 330 |
| Example 5 | DP$^5$ | 280 |
| Example 6 | DP$^6$ | 276 |
| Comparative Example 1 | DV$^1$ | Measurement impossible |

Next, the discharging capacity of the positive electrodes DP$^1$ to DP$^4$, DP$^6$ and DV$^1$ fabricated in this manner was evaluated by a 2032-type coin cell (manufactured by Hohsen Corporation). Into a recess in the lower-side parts of the coin cell, the positive electrode DP' stamped out to have a diameter of 14.5 mm was placed. A metal sodium foil having a diameter of 15.0 mm was used as a negative electrode; propylene carbonate containing 1M NaPF$_6$ (manufactured by Kishida Chemical Co., Ltd.) was used as an electrolytic solution; and a polyethylene porous film (having a thickness of 20 μm) was used as a separator, so as to fabricate sodium secondary batteries BDP$^1$ to BDP$^4$, BDP$^6$, and BDV$^1$. Here, assemblage of the battery was carried out in a glove box in an argon atmosphere.

<Battery Discharging Capacity Measurement Conditions>

The above sodium secondary battery was held at 25° C., and the discharging capacity was measured under the conditions shown below.

A charging and discharging test was carried out for two cycles. Each cycle was carried out in such a manner that, after the battery was subjected to CC-CV charging at a 0.1 C rate until the voltage reached 4.0 V (charging was ended when an electric current value of 0.01 C was reached) at the time of charging, the battery was subjected to CC discharging at a 0.1 C rate until the voltage reached 2.0 V. The discharging capacity in the second cycle is shown in Table 3. Also, the case in which it is described that measurement was impossible in Table 3 refers to a case in which the paste had been gelified and settled, making it impossible to produce the sodium secondary battery.

TABLE 3

| Sodium secondary battery | | Discharging capacity (second cycle) (mAh/g) |
|---|---|---|
| Example 1 | BDP$^1$ | 129 |
| Example 2 | BDP$^2$ | 130 |
| Example 3 | BDP$^3$ | 129 |
| Example 4 | BDP$^4$ | 117 |
| Example 6 | BDP$^6$ | 120 |
| Comparative Example 1 | BDV$^1$ | Measurement impossible |

From Tables 1 to 3, it has been found out that the present invention can avoid gelification of the electrode mixture paste, and the electrode mixture paste has a stable fluidity. Also, it has been found out that the positive electrodes obtained from the electrode mixture paste have a good adhesion force between the current collector and the electrode mixture. Among these, the positive electrode into which oxalic acid has been added gives a better performance.

The invention claimed is:

1. A method for producing an electrode mixture paste for a sodium secondary battery comprising: a step of kneading a positive electrode active material that is doped and undoped with a sodium ion, an electroconductive material, a binder, an organic solvent, and an acid having a valence number of 2 or more selected from the group consisting of an organic acid, phosphoric acid, boric acid, and sulfuric acid,
wherein the amount of addition of the acid having a valence number of 2 or more is 0.25 wt % or more and 5 wt % or less.

2. The method according to claim 1, wherein said acid having a valence number of 2 or more is an organic acid.

3. The method according to claim 2, wherein said organic acid is oxalic acid, malic acid, or succinic acid.

* * * * *